US012812003B2

(12) United States Patent
Gupta et al.

(10) Patent No.: US 12,812,003 B2
(45) Date of Patent: Nov. 24, 2026

(54) EFFICIENT DATA EXTRACTION FROM HETEROGENEOUS DATA CENTERS

(71) Applicant: American Megatrends International, LLC, Duluth, GA (US)

(72) Inventors: Parth Gupta, Atlanta, GA (US); Chitrak Gupta, Johns Creek, GA (US); Dharani Bharathi T, Chennai (IN); Manoj Kumar P, Panruti (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 143 days.

(21) Appl. No.: 18/823,301

(22) Filed: Sep. 3, 2024

(65) Prior Publication Data

US 2026/0067358 A1 Mar. 5, 2026

(51) Int. Cl.

| | |
|---|---|
| ***H04L 67/1061*** | (2022.01) |
| ***H04L 67/12*** | (2022.01) |
| ***H04L 67/306*** | (2022.01) |

(52) U.S. Cl.

CPC .......... *H04L 67/1068* (2013.01); *H04L 67/12* (2013.01); *H04L 67/306* (2013.01)

(58) Field of Classification Search

CPC ... H04L 67/1068; H04L 67/12; H04L 67/306; H04L 41/12; H04L 41/08; H04L 41/0803; H04L 41/0823–0833; H04L 43/002; H04L 43/08; H04L 43/00

See application file for complete search history.

(56) References Cited

U.S. PATENT DOCUMENTS

| | | | | |
|---|---|---|---|---|
| 10,270,675 | B1 * | 4/2019 | Lingen | H04L 43/16 |
| 11,095,730 | B1 * | 8/2021 | Chaganti | H04L 67/51 |
| 11,294,847 | B1 * | 4/2022 | Subbiah | G06F 13/426 |
| 11,956,828 | B2 * | 4/2024 | Tirronen | H04W 4/38 |
| 2021/0019131 | A1 * | 1/2021 | Tulsian | G06F 8/63 |
| 2022/0014592 | A1 * | 1/2022 | Kachare | H04L 67/12 |
| 2024/0231837 | A1 * | 7/2024 | Campi | G06F 9/4416 |
| 2025/0307019 | A1 * | 10/2025 | Chalamalasetti | G06F 9/505 |
| 2025/0315240 | A1 * | 10/2025 | Gupta | G06F 8/65 |
| 2026/0067358 | A1 * | 3/2026 | Gupta | H04L 67/1068 |

* cited by examiner

*Primary Examiner* — David R Lazaro

(74) *Attorney, Agent, or Firm* — Tim Tingkang Xia, Esq.; TROUTMAN PEPPER LOCKE LLP

(57) ABSTRACT

A computer system discovers a plurality of servers in a data center. The computer system onboards the plurality of servers into a data management service. The computer system generates, for each server of the plurality of servers, optimized command lists for multiple communication protocols. The computer system dynamically selects a preferred communication protocol for each server based on performance metrics. The computer system collects sensor data from the plurality of servers using the preferred communication protocol and the optimized command lists. The computer system stores the collected sensor data in a standardized format.

18 Claims, 4 Drawing Sheets

EFFICIENT DATA EXTRACTION FROM HETEROGENEOUS DATA CENTERS

BACKGROUND

Field

The present disclosure relates generally to computer systems, and more particularly, to techniques of efficiently extracting hardware data from heterogeneous data centers using adaptive protocol selection and optimized sampling strategies.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system discovers a plurality of servers in a data center. The computer system onboards the plurality of servers into a data management service. The computer system generates, for each server of the plurality of servers, optimized command lists for multiple communication protocols. The computer system dynamically selects a preferred communication protocol for each server based on performance metrics. The computer system collects sensor data from the plurality of servers using the preferred communication protocol and the optimized command lists. The computer system stores the collected sensor data in a standardized format.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
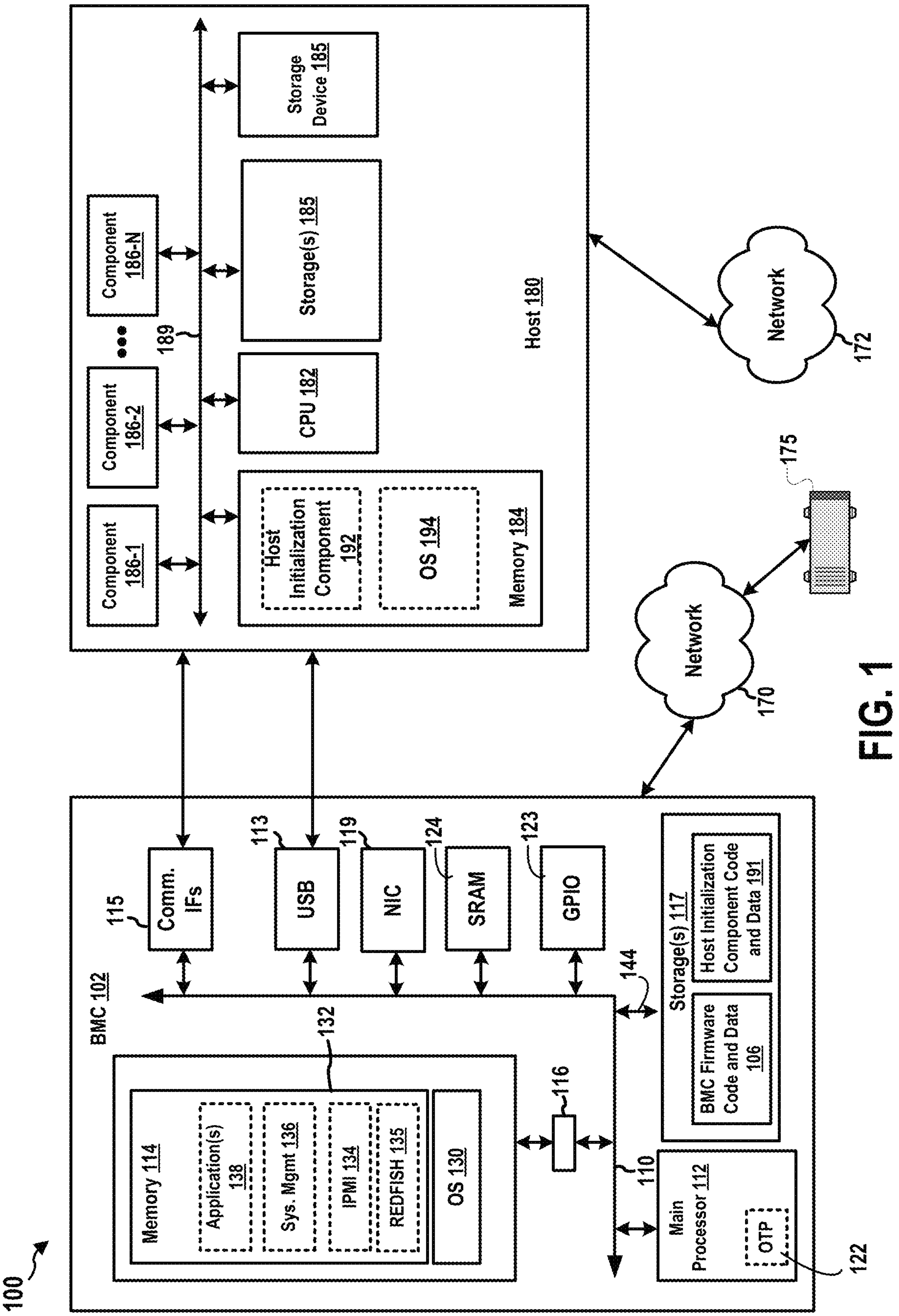
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface). Further, the main processing unit 112 contains an OTP memory 122 (i.e., one time programmable memory).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 a BMC OS 130 (i.e., operating system) and service components 132. The service components 132 include, among other components, IPMI services 134, Redfish services 135, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it.

Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Further, the storage(s) 117 is in communication with the communication channel 110 through a communication link 144.

Modern data centers contain a diverse array of servers with varying hardware configurations and management interfaces. This heterogeneity complicates the process of collecting hardware data uniformly and efficiently across all servers. As such, there is a need for a novel framework for optimizing data extraction from Baseboard Management Controllers (BMCs) in these heterogeneous environments. The BMC 102, as illustrated in FIG. 1, serves as a critical component for server management and monitoring. It supports multiple communication protocols, including IPMI services 134 and REDFISH services 135.

A system implementing the framework focuses on three main aspects:

1. Protocol Sampling and Switching: The system dynamically assesses the performance of available protocols (e.g., IPMI and Redfish) on each BMC 102. It measures the response times for data retrieval using these protocols and selects the fastest method for each server. This adaptive approach accounts for variations in protocol implementation and performance across different server models and BMC firmware versions.
2. Optimizing Data Extraction: To minimize network impact and reduce the number of calls to the BMC 102, the system employs intelligent data collection strategies. It generates optimized command lists for some or all protocols (such as IPMI and Redfish), tailored to each server's specific sensor configuration and user requirements. The system determines the most efficient method to retrieve data, whether through individual sensor queries or bulk data requests, based on the break-even point where bulk retrieval becomes more efficient than multiple individual queries.
3. Adaptive Sampling Frequency: The system may implement an exponential command reduction algorithm to dynamically adjust the sampling frequency for each sensor. When a sensor's value remains stable, the system exponentially increases the interval between data collection attempts, reducing unnecessary network traffic and processing load. Upon detecting a change, it reverts to the original sampling frequency to maintain data accuracy.

This adaptive approach is implemented through a series of components within the BMC 102's service components 132. The system utilizes the BMC's network interface card 119 and communication interfaces 115 to interact with the servers and collect data. The collected data is then standardized using parsers, which convert varied formats (e.g., from IPMI and Redfish) into a uniform structure for consistent storage and analysis.

The framework also incorporates a user-driven configuration process, allowing administrators to specify which sensors to monitor and at what frequency. This information is stored along with server-specific metadata, including optimal command lists and preferred communication methods, enabling the system to make informed decisions about data collection strategies for each server.

Figure 2:
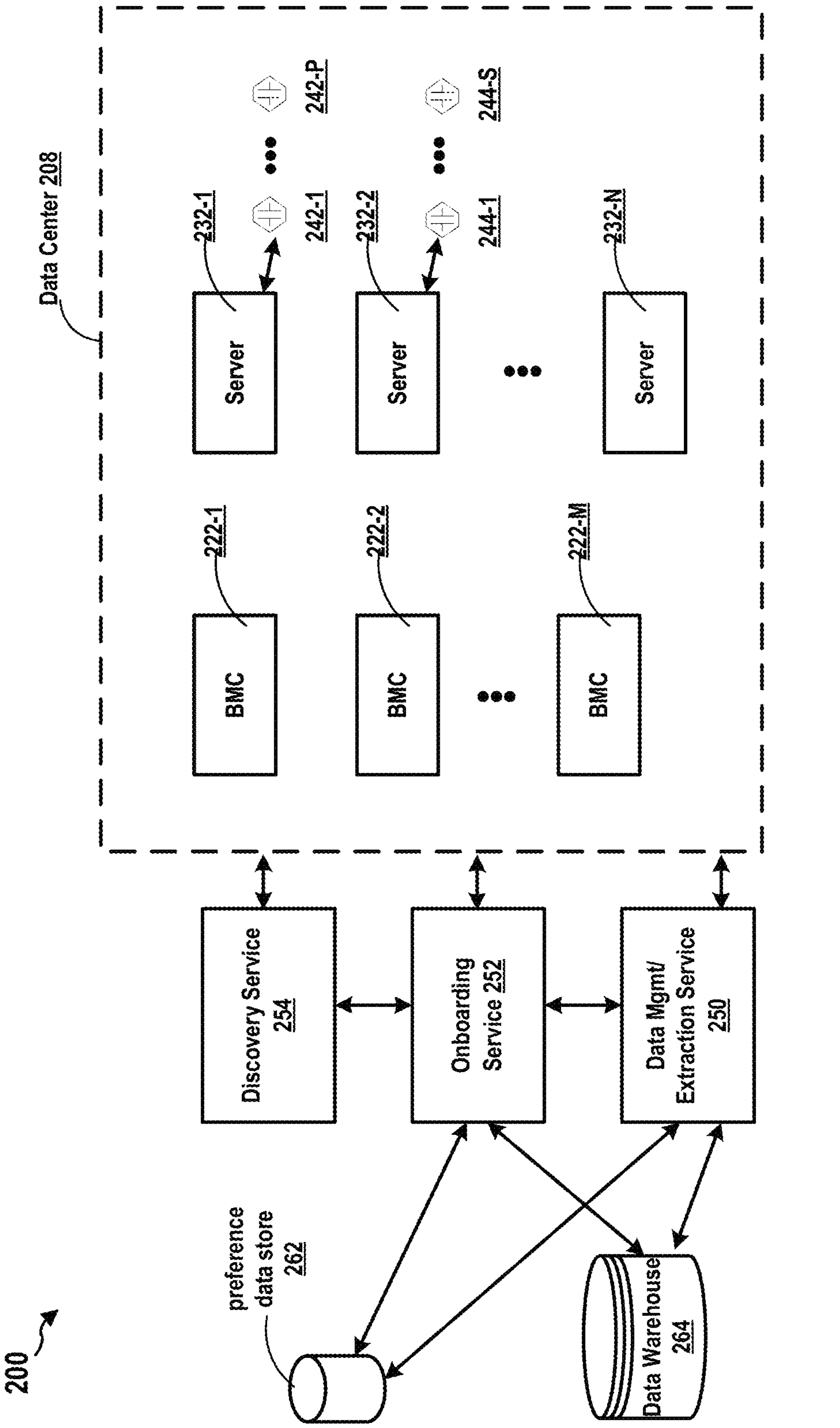
FIG. 2 is a diagram illustrating a system for efficient data extraction from heterogeneous data centers.

FIG. 2 is a diagram 200 illustrating a system for efficient data extraction from heterogeneous data centers. In this example, a data center 208 includes heterogeneous servers 232-1, 232-2, . . . , 232-N. These servers represent the diverse array of hardware configurations typically found in modern data centers. To manage these servers, BMCs 222-1, 222-2, . . . , 222-M are employed, each responsible for monitoring and controlling one or more servers.

A discovery service 254 may identify and catalog the BMCs 222-1, 222-2, . . . , 222-M as well as the servers 232-1, 232-2, . . . , 232-N within the data center 208. This service continuously scans the network to detect new devices and update the system's inventory of available hardware.

An onboarding service 252 works in conjunction with the discovery service 254 to integrate newly discovered BMCs and servers into a data management/extraction service 250. The onboarding service 252 provides essential information about the BMCs and servers to the data management/extraction service 250, enabling it to establish communication and begin data collection.

The data management/extraction service 250 is responsible for implementing the efficient data extraction framework. It utilizes a preference data store 262 to maintain user-defined settings and server-specific metadata. This includes information such as the list of sensors to monitor for each server, the desired sampling frequency for each sensor, and the preferred communication protocols for each BMC.

A data warehouse 264 is used by the data management/extraction service 250 to store the collected data (e.g., sensor data). The data may be stored in a standardized format. This centralized repository allows for efficient data analysis and long-term trend monitoring.

Each server in the data center is equipped with multiple sensors for monitoring various aspects of its operation and health. For example, the server 232-1 has sensors 242-1 to 242-P, while server 232-2 has sensors 244-1 to 244-S, and so on. These sensors may include temperature sensors, voltage monitors, fan speed sensors, and power consumption meters, among others.

The data management/extraction service 250 implements the adaptive sampling and protocol switching techniques described in the invention. It dynamically assesses the performance of available protocols (such as IPMI and Redfish) for each BMC, selecting the most efficient method for data retrieval. This service also employs the exponential command reduction algorithm to optimize sampling frequency, reducing unnecessary network traffic while maintaining data accuracy.

During the onboarding process, the system presents a complete list of available sensors for each server to the user. The user can then select which sensors they wish to monitor and specify the desired sampling frequency for each. Alternatively, the user may opt for an automatic mode where the system determines the optimal sampling frequency based on the sensor's behavior and importance.

The system may also implement sensor clustering, grouping sensors based on categories such as thermals, power, or API categories. This clustering can be done automatically based on the units of measurement or other relevant criteria, facilitating more efficient data collection and analysis.

This framework provides data center administrators with a powerful tool for monitoring server health and performance across a diverse hardware landscape. By optimizing data extraction processes and allowing fine-grained control over sensor monitoring, the system enables more efficient resource utilization and improved overall data center management.

Figure 3:
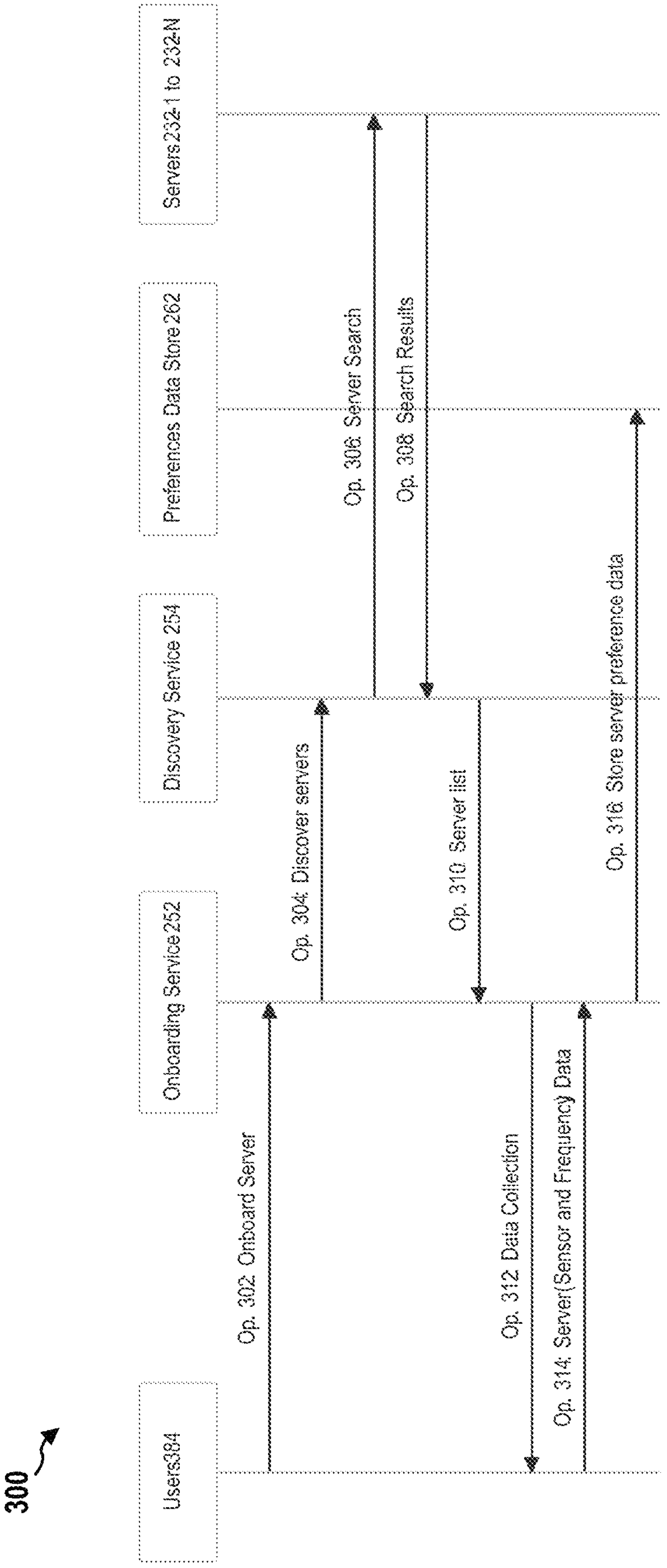
FIG. 3 is a sequence diagram illustrating the process of onboarding a server in the efficient data extraction system for heterogeneous data centers.

FIG. 3 is a sequence diagram 300 illustrating the process of onboarding a server in the efficient data extraction system for heterogeneous data centers.

In operation 302, one or more users 384 initiate the onboarding of a server by interacting with the onboarding service 252. This service acts as the primary interface for users to integrate new servers into the data management/extraction service 250.

In operation 304, the onboarding service 252 communicates with the discovery service 254 to identify available servers in the data center. The discovery service 254 is responsible for maintaining an up-to-date inventory of all servers and their capabilities within the data center environment.

In operation 306, the discovery service 254 then performs a server search, by querying the servers 232-1 to 232-N in the data center. This search aims to gather information about each server's hardware configuration, available sensors, and supported communication protocols.

In operation 308, the servers respond to the discovery service with search results, providing detailed information about their capabilities and current status. This information is for the data management/extraction service 250 to understand the heterogeneous nature of the data center and adapt its data extraction strategies accordingly.

The discovery service 254 compiles this information and, in operation 310, sends a comprehensive server list back to the onboarding service 252. This list contains all the necessary details about the available servers, including their unique identifiers, supported protocols (such as IPMI and Redfish), and available sensors.

In operation 312, the onboarding service 252 presents this collected data to the users 384. This step allows users to review the available servers and their capabilities, enabling them to make informed decisions about which servers and sensors to monitor.

In operation 314, the users 384 provide their preferences to the onboarding service 252, specifying which sensors they want to monitor for each server and the desired frequency of data collection. This user input is for tailoring the data extraction process to the specific needs of the data center administrators.

In operation 316, the onboarding service 252 stores these user-defined preferences in the preferences data store 262. This storage step is for the ongoing operation of the data management/extraction service 250, as it provides the necessary information to optimize data collection strategies for each server.

This onboarding process addresses the challenge of efficiently managing heterogeneous data centers by allowing users to customize data collection based on their specific requirements. The onboarding service 252 and/or the data management/extraction service 250 are able to adapt to different server configurations and communication protocols, as implemented by the BMC 102 and its various services, including the IPMI services 134 and REDFISH services 135.

By storing these preferences in the preferences data store 262, the data management/extraction service 250 can continuously refer to this information when making decisions about data collection strategies, protocol selection, and sampling frequencies.

The efficient data extraction framework for heterogeneous data centers addresses the challenge of collecting hardware data from diverse server environments. This framework, implemented through the data management/extraction service 250, utilizes adaptive techniques to optimize data collection from various BMCs 222-1 to 222-M across the data center 208.

A key feature of this framework is the command generation process, which is designed to determine the most efficient method for retrieving sensor data from each server. This process begins after the onboarding service 252 has completed the server discovery and user preference collection phases. The system then initiates a testing protocol to evaluate the performance of available communication protocols, specifically IPMI and Redfish, for each one of the BMCs 222-1 to 222-M.

The testing protocol is executed when there are no ongoing heavy IPMI or Redfish operations on the target server. This requirement is to obtain accurate baseline performance measurements. The data management/extraction service 250 first checks the availability of both IPMI and Redfish protocols on the target BMC (e.g., the BMC 222-1). Due to the heterogeneous nature of the data center, some servers may support only one protocol while others may support both.

Once the available protocols are identified, the system proceeds to measure the throughput of each protocol. This involves conducting a series of tests to determine the average time required to retrieve sensor information using different methods. Specifically, the system measures:

1. The average time to retrieve a single sensor's information through Redfish.
2. The average time to retrieve all sensor information through Redfish.
3. The average time to retrieve a single sensor's information through IPMI.
4. The average time to retrieve all sensor information through IPMI.

These measurements provide an understanding of each protocol's performance characteristics on the specific BMC. The system stores these average times for future reference:

1. IPMI single sensor retrieval time, using the "Get Sensor Reading" command from the IPMI specification.
2. IPMI all sensor retrieval time.
3. Redfish single sensor retrieval time.
4. Redfish all sensor retrieval time, including the time required for parsing the information.

This detailed performance data allows the data management/extraction service 250 to make informed decisions about which protocol and method (single sensor vs. all sensors) to use for data collection from each server. The inclusion of parsing time for Redfish accounts for the additional processing required to interpret the JSON-formatted data typically returned by Redfish APIs.

In a heterogeneous environment, server performance and network conditions may vary. By storing these performance metrics in the preference data store 262, the data management/extraction service 250 can dynamically adjust its data collection strategies over time.

The command generation process takes into account the user-defined preferences stored during the onboarding process, such as the specific sensors to monitor and their desired sampling frequencies. By combining this information with the protocol performance data, the data management/extraction service 250 can generate optimized command lists for each server.

The command generation process begins by analyzing the performance data collected during the initial testing phase. For each BMC, the system has stored the average retrieval times for both single sensor and all sensor commands using IPMI and Redfish protocols. This information is used to determine the most efficient method for data collection based on the specific requirements for each server.

A "break-even point" represents the number of sensors at which retrieving all sensor data becomes more efficient than executing individual sensor commands. This break-even point may vary for each server and protocol combination. For example, if the break-even point for a particular server is five sensors, and the user has requested data from only three sensors, the system will opt for individual sensor commands rather than an all-sensor command.

The data management/extraction service 250 calculates this break-even point by comparing the time required to execute an all-sensor command against the cumulative time of multiple individual sensor commands. This comparison can be expressed mathematically as:

$$T_{all} > n \times T_{individual}$$

Where $T_{all}$ represents the time to retrieve all sensor data, n is the number of requested sensors, and $T_{individual}$ is the average time to retrieve data from a single sensor.

If the condition is true, the system will generate individual commands for each requested sensor. Otherwise, it will use an all-sensor command to retrieve the data more efficiently.

The command generation process also considers user-defined preferences, such as the specific sensors to monitor and their desired sampling frequencies. These preferences are stored in the preferences data store 262 during the onboarding process. By integrating this user input with the protocol performance data, the system can generate a tailored list of commands for each server. Data is collected in the fastest and most efficient manner possible.

This adaptive approach allows the system to optimize data collection strategies for each server individually, taking into account the unique characteristics of its BMC and the specific sensors requested by the user. The result is a set of optimized command lists, one for IPMI and one for Redfish, tailored to each server's capabilities and the user's requirements.

The command lists are stored in the preference data store 262, along with other server-specific metadata such as the preferred communication method and the list of sensors to track. This information enables the data management/extraction service 250 to make informed decisions about data collection strategies on an ongoing basis.

By generating these optimized command lists, the system can significantly reduce the number of calls made to each BMC, minimizing network traffic and processing overhead. Furthermore, this approach allows for flexibility in dealing with the heterogeneous nature of data centers. Some servers may perform better with IPMI commands, while others may be more responsive to Redfish queries. By maintaining separate command lists for each protocol, the system can easily switch between them based on real-time performance metrics or changing network conditions.

The dynamic command selection process builds upon the initial command generation process, where the data management/extraction service 250 determines the most efficient method for retrieving sensor data from each server. However, server performance and network conditions may vary over time, necessitating an adaptive approach to data collection.

In a realtime approach, the data management/extraction service 250 continuously assesses the performance of available protocols (IPMI and Redfish) for each BMC of the BMCs 222-1 to 222-M. This is done by issuing simple commands through both protocols and comparing their response times to the average speeds previously recorded. This real-time evaluation allows the system to account for temporary fluctuations in server load or network congestion that may affect the relative performance of IPMI and Redfish.

For example, if a BMC 222-1 is experiencing heavy IPMI load due to ongoing management tasks, the system may detect that Redfish commands are currently responding faster. In this case, the data management/extraction service 250 would dynamically switch to using the optimized Redfish command list stored in the preference data store 262 for that particular server.

In a sampling approach, the data management/extraction service 250 periodically reassesses the performance of IPMI and Redfish protocols. Two sampling methods are proposed:

1. Systematic Sampling: The system re-evaluates protocol performance at fixed intervals, such as every nth data extraction cycle. This approach provides regular performance checks while reducing the frequency of evaluations compared to the real-time mode.
2. Simple Random Sampling: The system randomly selects times to re-evaluate protocol performance. This method can help detect performance variations that may occur at irregular intervals while minimizing predictable evaluation overhead.

Both sampling methods allow the data management/extraction service 250 to adapt to longer-term changes in server performance or network conditions while reducing the computational and network overhead associated with continuous real-time evaluation.

The dynamic command selection feature complements the initial command generation process by allowing the data management/extraction service 250 to adapt to changing conditions in the heterogeneous data center environment. The data management/extraction service 250 can utilize the preference data store 262 to store and retrieve the optimized command lists for each protocol, as well as historical performance data to inform its decision-making process.

Further, the data management/extraction service 250 may implement a bandwidth and call reduction feature, in particular, for single sensor commands within the command list generated by the data management/extraction service 250.

More specifically, the data management/extraction service 250 may utilize an exponential command reduction algorithm, which is designed to adaptively adjust the frequency of data collection based on the observed stability of sensor readings. The data management/extraction service 250 operates on a per-sensor basis for each of the servers 232-1 to 232-N in the data center 208.

The algorithm begins by collecting data at an initial time $T_1$ (after one reference time period), which represents the base sampling interval defined by the user during the onboarding process. If no change is detected in the sensor reading at this interval, the system exponentially increases the time between subsequent data collection attempts. Specifically, the next data collection occurs at time $T_2$ (after two reference time periods), then at $T_4$ (after four reference time periods), $T_8$ (after eight reference time periods), and so on, following the pattern $T_{2^n}$ where n is the number of consecutive unchanged readings.

The exponential nature of this algorithm results in a significant reduction in the number of calls made to the BMCs 222-1 to 222-M over time for stable sensor readings. This reduction in calls follows a Big O notation of O $(C^{-2})$, where C represents the number of time periods. This notation indicates that the number of calls decreases quadratically as time progresses, leading to substantial savings in network bandwidth and processing resources.

However, the algorithm remains responsive to changes in sensor readings. If a change is detected at any sampling point, the data management/extraction service 250 immediately reverts to the original, user-defined sampling frequency. Any significant changes in server status or performance are captured promptly, maintaining the system's ability to provide accurate and timely information.

The implementation of this algorithm requires the data management/extraction service 250 to maintain state information for each monitored sensor. This information, which may be stored in the preference data store 262 or other storages of the data management/extraction service 250, includes the current sampling interval, the last recorded value, and a timestamp of the last change detected. By maintaining this state, the system can make informed decisions about when to collect data and when to increase the sampling interval.

This feature further reduces data storage requirements. As fewer data points are collected for stable sensors, the volume of data that needs to be stored in the data warehouse 264 is significantly reduced. This not only conserves storage resources but also improves the efficiency of data analysis processes by reducing the amount of redundant data that needs to be processed.

Another aspect of this framework is the storage of server-specific metadata, which is for optimizing data collection strategies. As outlined in the discussion, the system stores several critical pieces of information for each server:

1. Server unique identification number: This allows the system to uniquely identify and manage each server in the heterogeneous environment.
2. IPMI command list and Redfish command list: These optimized command lists are generated based on the initial performance testing of each protocol on the specific server. By maintaining separate lists for IPMI and Redfish, the system can quickly switch between protocols as needed.
3. Preferred method of communication: This indicates whether IPMI or Redfish is currently the most efficient protocol for communicating with the server's BMC. This preference may change dynamically based on real-time performance evaluations.
4. Frequency of commands: This refers to the sampling frequency for each sensor, which can be adjusted using the exponential command reduction algorithm to optimize bandwidth usage.
5. List of sensors to track: This is derived from user preferences specified during the onboarding process, allowing the system to focus on collecting only the most relevant data.

This metadata may be stored in the preferences data store 262, which serves as a central repository for server-specific information. The data management/extraction service 250 can access this information to make informed decisions about data collection strategies on an ongoing basis.

The storage of optimized command lists for both IPMI and Redfish is particularly important in a heterogeneous environment. Some servers may perform better with IPMI commands, while others may be more responsive to Redfish queries. By maintaining separate command lists, the system can easily switch between protocols based on real-time performance metrics or changing network conditions. The preferred method of communication is determined through the dynamic command selection process, which can operate in real-time or use sampling approaches.

The frequency of commands is initially set based on user preferences but can be dynamically adjusted using the exponential command reduction algorithm. This algorithm significantly reduces the number of calls made to the BMCs 222-1 to 222-M over time for stable sensor readings. This approach not only conserves network bandwidth but also reduces the volume of data that needs to be stored in the data warehouse 264.

The list of sensors to track is determined during the onboarding process, where users can select specific sensors from each server based on their monitoring requirements. This user-driven approach allows for fine-grained control over data collection.

Further more, the data management/extraction service 250 may utilize standardization parsers. The data management/extraction service 250 may collect data from various BMCs 222-1 to 222-M using different protocols, primarily IPMI and Redfish. These protocols often return data in distinct formats, with IPMI typically providing text-based output and Redfish returning JSON-formatted data.

To maintain consistency and facilitate efficient data storage and analysis, the data management/extraction service 250 may implement independent parsers for each protocol. These parsers are designed to intercept the raw output from IPMI and Redfish queries, extract the relevant sensor information, perform basic data cleaning, and convert the information into a uniform, standardized format.

As described supra, the data management/extraction service 250 may switch between IPMI and Redfish protocols for a single server based on real-time performance evaluations or sampling results. This means that consecutive data points for the same sensor on a single server might be collected using different protocols, resulting in inconsistent data formats if not standardized.

The standardization process begins with the interception of the raw output from either IPMI or Redfish queries. The parser then identifies the specific sensor information required, as defined by the user preferences stored in the preferences data store 262 during the onboarding process. This step is for focusing on the relevant data and discarding any extraneous information returned by the protocols.

Next, the parser performs basic data cleaning. This step may involve removing any protocol-specific metadata, standardizing units of measurement, or handling any known quirks or inconsistencies in the data format returned by specific BMC implementations. The cleaning process is for improving data quality and consistency across different servers and protocols.

Furthermore, the parser converts the cleaned data into a uniform, standard format. This standardized format is designed to be consistent regardless of the original data source or protocol used for collection. By converting all data to this common format, the system simplifies downstream data processing, storage, and analysis tasks.

The standardized data can then be efficiently stored in the data warehouse 264. This uniform format allows for easier querying and analysis of data across multiple servers and time periods, regardless of the original collection method.

The implementation of these standardization parsers complements other features of the efficient data extraction framework, such as the dynamic command selection and the exponential command reduction algorithm. By providing a consistent data format, the parsers enable these other components to operate more effectively, as they can work with a uniform data structure regardless of the underlying collection method.

Moreover, the standardization process supports the system's ability to adapt to heterogeneous environments. As new server types or BMC implementations are added to the data center, only the initial parsing step needs to be updated to handle any new data formats. The rest of the system can continue to operate with the standardized data, minimizing the impact of hardware diversity on the overall data management process.

As described infra, the data management/extraction service 250 collects data from various BMCs 222-1 to 222-M using different protocols, primarily IPMI and Redfish. These protocols often return data in distinct formats, with IPMI typically providing text-based output and Redfish returning JSON-formatted data.

To maintain consistency and facilitate efficient data storage and analysis, the data management/extraction service 250 implements a standardization process. This process converts data from all sources, including IPMI and Redfish, into a uniform standard format. The standardized format retains core information essential for effective server monitoring and management. This includes the server unique identification, which allows the system to associate data with specific servers in the heterogeneous environment. The time of reading is also preserved, enabling temporal analysis of server performance and health. Additionally, the sensor name and values are retained, providing the actual monitoring data for each sensor.

As described supra, the parser converts the data into the uniform, standard format. This standardized format is designed to be consistent regardless of the original data source or protocol used for collection. By converting all data to this common format, the system simplifies downstream data processing, storage, and analysis tasks.

The standardized data is then inputted into a preferred database, which may be implemented as part of the data warehouse 264. This uniform format allows for casier querying and analysis of data across multiple servers and time periods, regardless of the original collection method. It supports efficient data retrieval and analysis, enabling data center administrators to gain insights into server performance and health across their heterogeneous environment.

The implementation of this standardization process complements other features of the efficient data extraction framework, such as the dynamic command selection and the exponential command reduction algorithm. By providing a consistent data format, the standardization process enables these other components to operate more effectively, as they can work with a uniform data structure regardless of the underlying collection method.

Moreover, the standardization process supports the system's ability to adapt to heterogeneous environments. As new server types or BMC implementations are added to the data center, only the initial parsing step needs to be updated to handle any new data formats. The rest of the system can continue to operate with the standardized data, minimizing the impact of hardware diversity on the overall data management process.

Further, as the data management/extraction service 250 may switch between IPMI and Redfish protocols for a single server based on real-time performance evaluations or sampling results, the standardization process maintains data consistency. This means that even if consecutive data points for the same sensor on a single server are collected using different protocols, the resulting data stored in the preferred database will be uniform and easily comparable.

Figure 4:
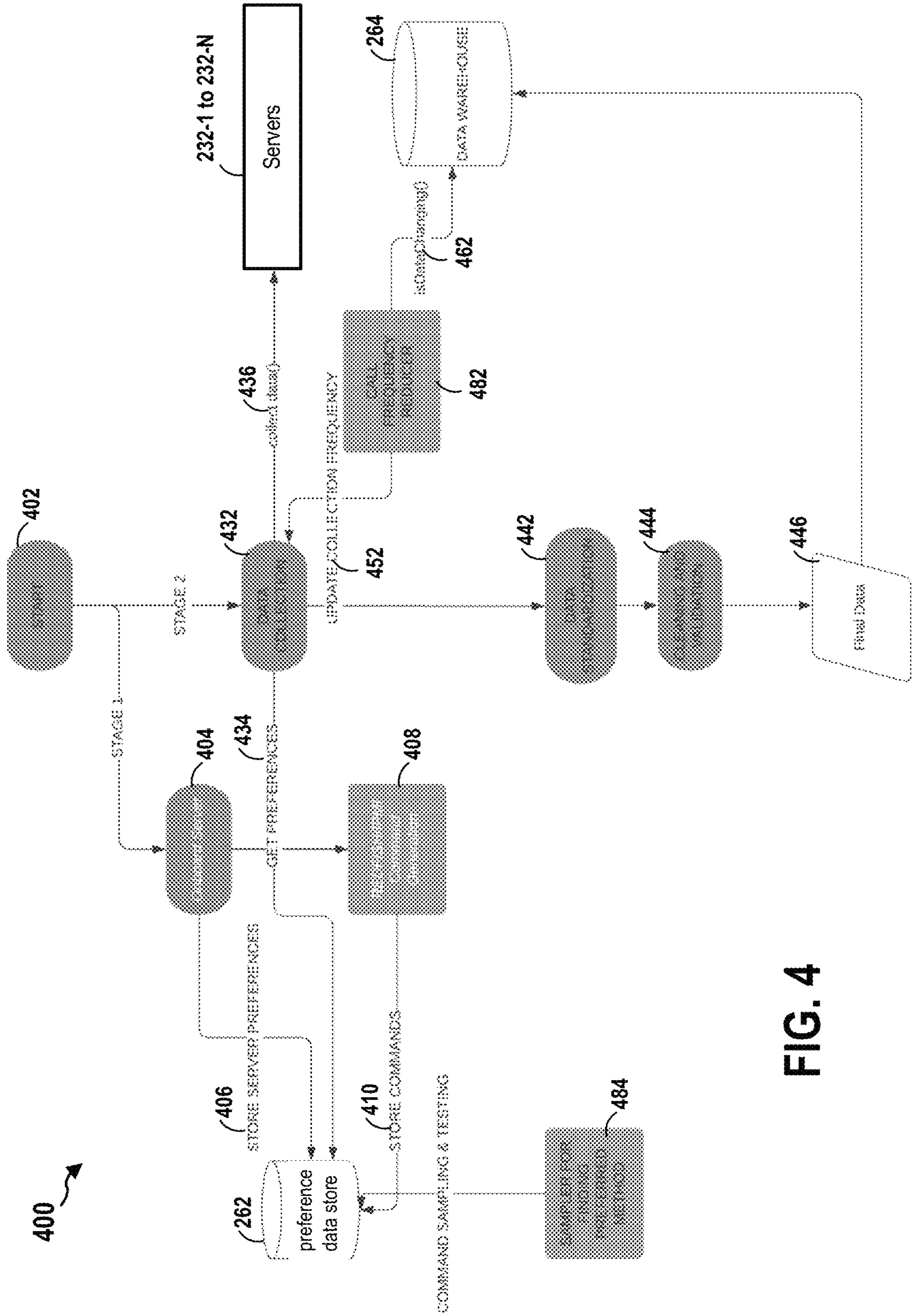
FIG. 4 is a flowchart of a process for efficient data extraction from heterogeneous data centers.

FIG. 4 is a flowchart of a process for efficient data extraction from heterogeneous data centers. The flowchart is divided into two main stages: Stage 1 for server onboarding and Stage 2 for data collection.

In operation 402, the data management/extraction service 250 starts both Stage 1 and Stage 2 operations. In operation 404, the onboarding service 252 utilizes the discovery service 254 onboard servers 231-1 to 232-M into the data management/extraction service 250.

In operation 406, the onboarding service 252 stores server preferences provided by users 384 in the preference data store 262. These preferences include the list of sensors to monitor and their desired sampling frequencies, as specified by the users 384 during the onboarding process described in FIG. 3.

Concurrently, in operation 408, the data management/extraction service 250 generates REDFISH and IPMI commands tailored to the specific server being onboarded. The data management/extraction service 250 tests the performance of both protocols on the server and creating optimized command lists for each. In operation 410, these generated commands are stored in the preference data store 262, allowing for quick retrieval during the data collection phase.

In operation 420, a sampler 484, which is responsible for determining the preferred method of communication (REDFISH or IPMI) for each server, performs command sampling and testing, continuously updating the preference data store 262 with the most efficient protocol for each server based on real-time performance metrics.

Stage 2 of the flowchart focuses on the actual data collection process. In operation 432, the data collection begins, utilizing the preferences and optimized commands stored in the preference data store 262.

In operation 434, the data management/extraction service 250 retrieves preferences from the preference data store 262. These preferences may include: a) list of sensors to monitor for each server; b) desired sampling frequency for each sensor; c) optimized command lists for both IPMI and Redfish protocols; and/or d) preferred method of communication (e.g., IPMI or Redfish) for each server. In operation 436, the data management/extraction service 250 collects data, according to the preferences, from the servers 232-1 to 232-N using the most efficient method determined by the sampler 484.

Further, a call frequency reducer 482 implements the exponential command reduction algorithm described supra. It dynamically adjusts the frequency of data collection based on whether the sensor data is changing. In operation 452, the call frequency reducer 482 updates the collection frequency, optimizing network usage and reducing unnecessary calls to stable sensors. In operation 462, the call frequency reducer 482 determines if data is changing by comparing current readings with previous data stored in the data warehouse 264. This comparison allows the system to implement the exponential backoff strategy for stable sensors, significantly reducing the number of calls over time.

Once data is collected, it undergoes a standardization process in operation 442. This step is for converting data from various sources (REDFISH and IPMI) into a uniform format. The standardized data then goes through a cleaning and validation process in operation 444.

In operation 446, the data management/extraction service 250 generates the final data, which is then stored in the data warehouse 264.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of a computing device, comprising:
- discovering a plurality of servers in a data center;
- onboarding the plurality of servers into a data management service;
- generating, for each server of the plurality of servers, optimized command lists for multiple communication protocols;
- dynamically selecting a preferred communication protocol for each server based on performance metrics;
- collecting sensor data from the plurality of servers using the preferred communication protocol and the optimized command lists; and
- storing the collected sensor data in a standardized format, wherein storing the collected sensor data in the standardized format comprises:
- intercepting raw output from the multiple communication protocols;
- extracting relevant sensor information;
- performing basic data cleaning; and
- converting cleaned data into a uniform format regardless of an original data source or protocol used for collection.

2. The method of claim 1, further comprising:
- presenting a list of available sensors for each server of the plurality of servers to a user;
- receiving user preferences for sensor selection and sampling frequency; and
- storing the user preferences in a preference data store.

3. The method of claim 2, wherein generating the optimized command lists comprises:
- testing performance of available communication protocols for each server;
- determining a break-even point for a number of sensors at which retrieving all sensor data becomes more efficient than executing individual sensor commands; and
- creating separate command lists for each available protocol based on the break-even point and the user preferences.

4. The method of claim 1, wherein dynamically selecting the preferred communication protocol comprises:
- periodically sampling performance of available protocols for each server; and
- updating the preferred communication protocol based on sampling results.

5. The method of claim 4, wherein periodically sampling the performance comprises one of:
- systematic sampling at fixed intervals; or
- simple random sampling at random intervals.

6. The method of claim 1, further comprising:
- implementing an exponential command reduction algorithm to dynamically adjust a frequency of data collection for each sensor based on stability of sensor readings.

7. The method of claim 6, wherein the exponential command reduction algorithm comprises:
collecting data at an initial time period;
if no change is detected in a sensor reading, exponentially increasing time between subsequent data collection attempts; and
if a change is detected, reverting to an original sampling frequency.

8. A computing system, comprising:
at least one computing device including:
a memory; and
at least one processor coupled to the memory and configured to:
discover a plurality of servers in a data center;
onboard the plurality of servers into a data management service;
generate, for each server of the plurality of servers, optimized command lists for multiple communication protocols;
dynamically select a preferred communication protocol for each server based on performance metrics;
collect sensor data from the plurality of servers using the preferred communication protocol and the optimized command lists; and
store the collected sensor data in a standardized format, wherein to store the collected sensor data in the standardized format, the at least one processor is configured to:
intercept raw output from the multiple communication protocols;
extract relevant sensor information;
perform basic data cleaning; and
convert cleaned data into a uniform format.

9. The computer system of claim 8, wherein the at least one processor is further configured to:
present a list of available sensors for each server of the plurality of servers to a user;
receive user preferences for sensor selection and sampling frequency; and
store the user preferences in a preference data store.

10. The computer system of claim 9, wherein to generate the optimized command lists, the at least one processor is configured to:
test performance of available communication protocols for each server;
determine a break-even point for a number of sensors at which retrieving all sensor data becomes more efficient than executing individual sensor commands; and
create separate command lists for each available protocol based on the break-even point and the user preferences.

11. The computer system of claim 8, wherein to dynamically select the preferred communication protocol, the at least one processor is configured to:
periodically sample performance of available protocols for each server; and
update the preferred communication protocol based on sampling results.

12. The computer system of claim 11, wherein to periodically sample the performance, the at least one processor is configured to perform one of:
systematic sampling at fixed intervals; or
simple random sampling at random intervals.

13. The computer system of claim 8, wherein the at least one processor is further configured to:
implement an exponential command reduction algorithm to dynamically adjust a frequency of data collection for each sensor based on stability of sensor readings.

14. The computer system of claim 13, wherein the exponential command reduction algorithm comprises:
collecting data at an initial time period;
if no change is detected in a sensor reading, exponentially increasing time between subsequent data collection attempts; and
if a change is detected, reverting to an original sampling frequency.

15. A non-transitory computer-readable medium storing computer executable code for operation of a computer system including at least one computing device, comprising code to:
discover a plurality of servers in a data center;
onboard the plurality of servers into a data management service;
generate, for each server of the plurality of servers, optimized command lists for multiple communication protocols;
dynamically select a preferred communication protocol for each server based on performance metrics;
collect sensor data from the plurality of servers using the preferred communication protocol and the optimized command lists; and
store the collected sensor data in a standardized format, wherein the code to store the collected sensor data in the standardized format comprises code to:
intercept raw output from the multiple communication protocols;
extract relevant sensor information;
perform basic data cleaning; and
convert cleaned data into a uniform format.

16. The non-transitory computer-readable medium of claim 15, further comprising code to:
present a list of available sensors for each server of the plurality of servers to a user;
receive user preferences for sensor selection and sampling frequency; and
store the user preferences in a preference data store.

17. The non-transitory computer-readable medium of claim 16, wherein the code to generate the optimized command lists comprises code to:
test performance of available communication protocols for each server;
determine a break-even point for a number of sensors at which retrieving all sensor data becomes more efficient than executing individual sensor commands; and
create separate command lists for each available protocol based on the break-even point and the user preferences.

18. The non-transitory computer-readable medium of claim 15, wherein the code to dynamically select the preferred communication protocol comprises code to:
periodically sample performance of available protocols for each server; and
update the preferred communication protocol based on sampling results.

* * * * *